Reissued July 10, 1934

Re. 19,231

UNITED STATES PATENT OFFICE 19,231

MEDICINAL OIL SOLUTION

Edgar B. Carter and Edmond E. Moore, Waukegan, Ill., assignors to Abbott Laboratories, North Chicago, Ill., a corporation of Illinois No Drawing. Original No. 1,947,519, dated February 20, 1934, Serial No. 551,560, July 17, 1931. Application for reissue April 18, 1934, Serial No. 721,244

14 Claims. (Cl. 167—58)

An object of our invention is to produce solutions, or stable colloidal suspensions, of acidic organo-metallic compounds in mineral oil. These compounds have the general formula HOR where R is an organo-metallic, preferably a mercurated aromatic, residue, and they are not normally soluble in mineral oil.

Such object is effected by first forming an alkyl-amine salt of the organo-metallic compound (if the compound is not already in the form of an alkylamine salt), and then adding an alkylamine soap, thereby peptizing the salt so that it will form a solution or stable colloidal suspension in mineral oil.

We have not proven that the solutes are in molecular dispersion, but since the products have the appearance and, insofar as we have determined, the properties of true solutions, we will refer to them as solutions.

It is well known that certain mercurated phenolic compounds and other organo-metallic compounds are effective therapeutic agents. Many of these compounds are relatively insoluble in water, and are used in the form of their water-soluble salts. The compounds and their salts in general are also insoluble in mineral oils. For application to certain tissues and areas, as for mucous membranes, it is frequently desirable to employ the product in oil solution, preferably mineral oil. While solutions or colloidal suspensions of mineral oil insoluble materials have heretofore been prepared in animal and vegetable oils, such solutions or suspensions are not desirable, especially for pharmaceutical purposes, because of the lack of chemical stability of such media, e. g., their susceptibility to oxidation, whereby they become thick and gummy, and also their susceptibility to rancidification. Attempts have been made to overcome this disadvantage by first dissolving the materials in animal or vegetable oils, and then dissolving such solutions in a mineral oil. However, these preparations, also, are undesirable because of their large content of animal or vegetable oil, which have the disadvantages just indicated. These disadvantages are lacking where the fluid carrier is composed principally of mineral oil. It will be understood, of course, that the presence of a small amount of animal or vegetable oil, in quantities insufficient to stabilize the solution, is not highly objectionable.

We have discovered that these compounds, when in the form of their alkylamine salts, can be peptized by alkylamine soaps so that when they are added to a mineral oil, a solution results.

In order that a therapeutic agent may exert its full bactericidal value, it is sometimes advantageous to have the agent dissolved in oil in the form of a water-soluble salt. This may therefore be accomplished by our invention. We have also found that it is possible to select certain alkylamines for use in these compounds which themselves exert therapeutic actions and which thereby enhance the therapeutic desirability of the therapeutic constituents of the compounds obtained.

*General method.*—The invention can be practiced in various ways, although, in certain cases, we find it desirable first to prepare a soap by combining suitable amounts of an amine and a fatty acid (not necessarily by molecular weights of the materials, as the presence of an excess of either one of them usually is not objectionable), and then incorporating the alkylamine soap and the salt of the organo-metallic compound with the oil. In other cases it is possible to practice the process with a different step sequence.

*Example*

4 grams of finely divided 4-nitro anhydro-hydroxy mercuri-orthocresol is mixed with 92 grams of ephedrine at a temperature not exceeding 60° C. and allowed to stand until the reaction is complete. Ephedrine laurate is prepared by mixing 8.26 grams (1 molecular equivalent) of ephedrine with 10 grams of lauric acid at 60° C. The two preparations are then mixed together at about 60° C., following which there is added sufficient neutral oil (preferably light mineral oil) to make a total weight of 10,000 grams. The mixture is stirred until solution results. The proportions given result in a composition containing the ephedrine salt of the acidic organo-metallic compound, an ephedrine soap as stabilizing agent, with a certain quantity of ephedrine remaining uncombined, the latter having been added in excess of its combining proportion. This free ephedrine is of value in the product, inasmuch as it lessens the congestion and shrinks the swollen mucosa, and thus provides a better opportunity for the organo-metallic salt to contact with the invading organisms and exert its antiseptic action.

The following preparations may be made similarly, the alkylamine salt of the organo-metallic compound and the alkylamine soap of the fatty acid being formed in each case:

| Amine | Oil insoluble compound | Fatty acid |
|---|---|---|
| Ephedrine | 4-nitro-acetoxy mercuri ortho-cresol. | Erucic. |
| Do | do | Palmitic. |
| Do | do | Stearic. |
| Do | do | Lauric. |
| Do | 4-nitro-anhydro hydroxy mercuri orthocresol. | Erucic. |
| Do | do | Palmitic. |
| Do | do | Lauric. |
| Do | do | Oleic. |
| Do | do | Coconut oil acids. |
| Do | Ethyl mercuri thiosalicylic acid | Oleic. |
| Do | Hydroxy mercuri salicyl oxyacetic acid. | Do. |
| Do | Oxy-mercuri ortho-nitrophenol | Do. |
| Do | 2,7 dibromo 4-hydroxy mercuri fluorescein. | Do. |
| Do | Arsanilic Acid | Do. |
| Do | 4-(hydroxy ethyl amino)-phenyl arsonic acid. | Do. |
| Pseudo-ephedrine | 4-nitro-anhydro hydroxy mercuri orthocresol. | Do. |
| Triethanolamine | do | Do. |
| Tributylamine | do | Do. |
| Dibutylamino propanol. | do | Do. |
| Dibutylamine | do | Do. |
| Diethylamine | do | Do. |

In the preparation of such solutions, it is occasionally advantageous to add alcohol or water to the mixture of the amine and the acidic organo-metallic compound to aid the reaction between the two compounds. The solvent is then removed before proceeding with the next step.

Various modifications and changes in proportions and substitutions of equivalents coming within the scope of our invention will doubtless occur to those skilled in the art. Hence, we do not wish to be limited to the precise embodiments disclosed above except as set forth in the appended claims which are to be interpreted as broadly as the state of the art will permit.

We claim as our invention:

1. The improvement in the art of preparing a stable oil solution of an acidic organo-mercuri compound which normally is insoluble in oil, which compound is adaptable for application to the mucous membrane of the human body, said process consisting in forming an alkyl amine salt of said compound and incorporating said salt and an alkyl amine soap in a mineral oil which is liquid at ordinary temperatures.

2. A process of preparing a stable mineral oil solution of an acidic organo-metallic compound which normally is insoluble in mineral oil, comprising forming an alkylamine salt of said compound and incorporating said salt and an alkylamine soap in a mineral oil which is liquid at ordinary temperatures.

3. A process as defined in claim 2, wherein said alkylamine is ephedrine.

4. A pharmaceutical comprising a stable solution in a mineral oil, which is liquid at ordinary temperatures, of an alkylamine salt of an organo-metallic compound, and, as a stabilizing agent, an alkylamine soap.

5. A composition as defined in claim 4, wherein said alkylamine is ephedrine.

6. A composition as defined in claim 4, wherein said organo-metallic compound is a phenolic mercurial.

7. A composition as defined in claim 4, wherein said organo-metallic compound is a phenolic mercurial, and said alkylamine is ephedrine.

8. A composition as defined in claim 4, wherein said organo-metallic compound is 4-nitro-anhydro-hydroxy-mercuri ortho-cresol and said alkylamine is ephedrine.

9. A combination as defined in claim 4, wherein the alkylamine is ephedrine and is present in excess.

10. A process as defined in claim 2, wherein said alkylamine is pseudo-ephedrine.

11. A composition as defined in claim 4, wherein said alkylamine is pseudo-ephedrine.

12. A composition as defined in claim 4, wherein said organo-metallic compound is a phenolic mercurial, and said alkylamine is pseudo-ephedrine.

13. A composition as defined in claim 4, wherein said organo-metallic compound is 4-nitro-anhydro-hydroxy-mercuri ortho-cresol and said alkylamine is pseudo-ephedrine.

14. A combination as defined in claim 4, wherein the alkylamine is pseudo-ephedrine and is present in excess.

EDGAR B. CARTER.
EDMOND E. MOORE.